June 11, 1929.  E. E. GREVE  1,716,817
PUMPING JACK FRAME
Filed Feb. 24, 1925  2 Sheets-Sheet 1
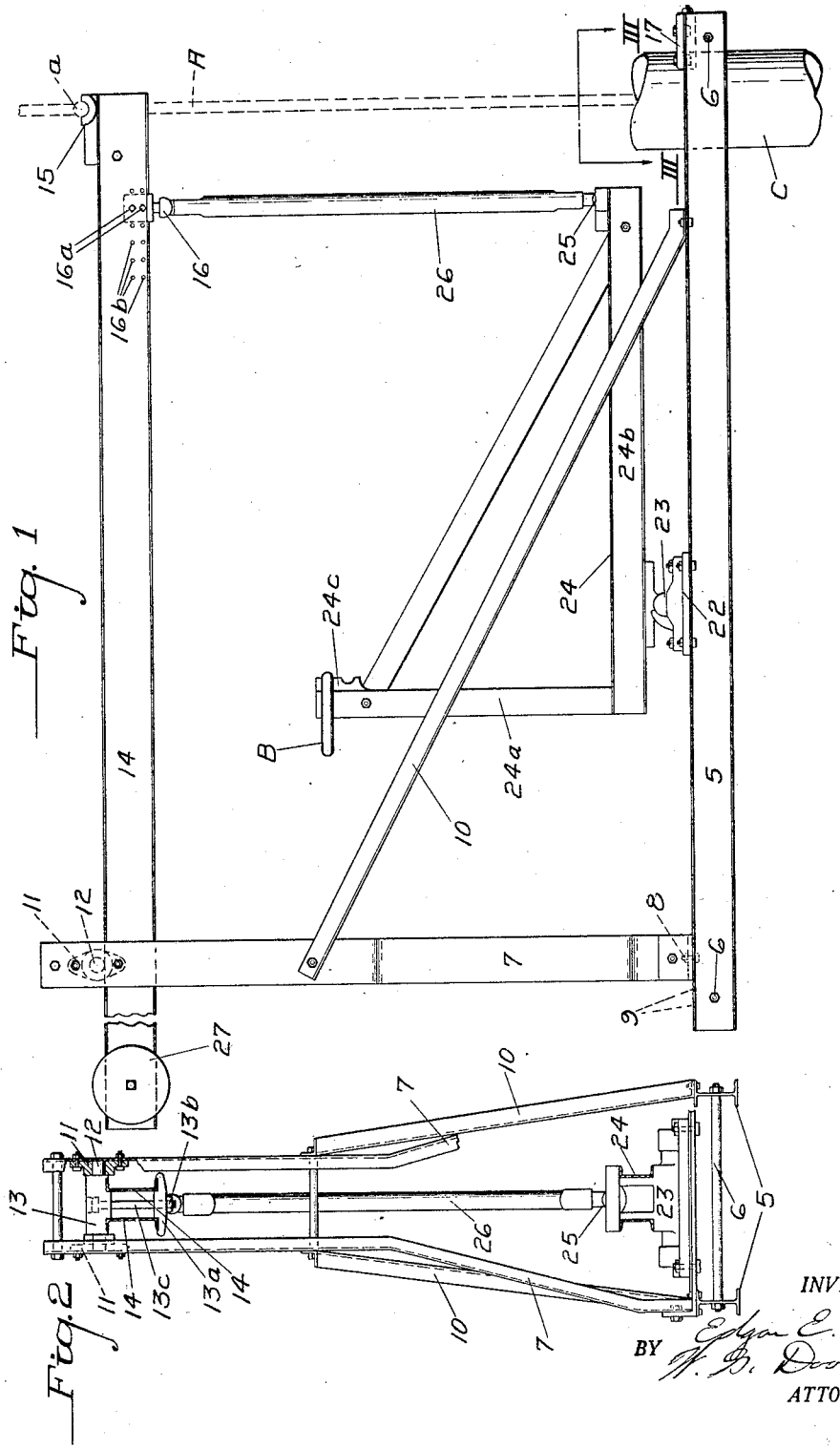
INVENTOR.
Edgar E. Greve
BY
W. D. Doolittle
ATTORNEY.

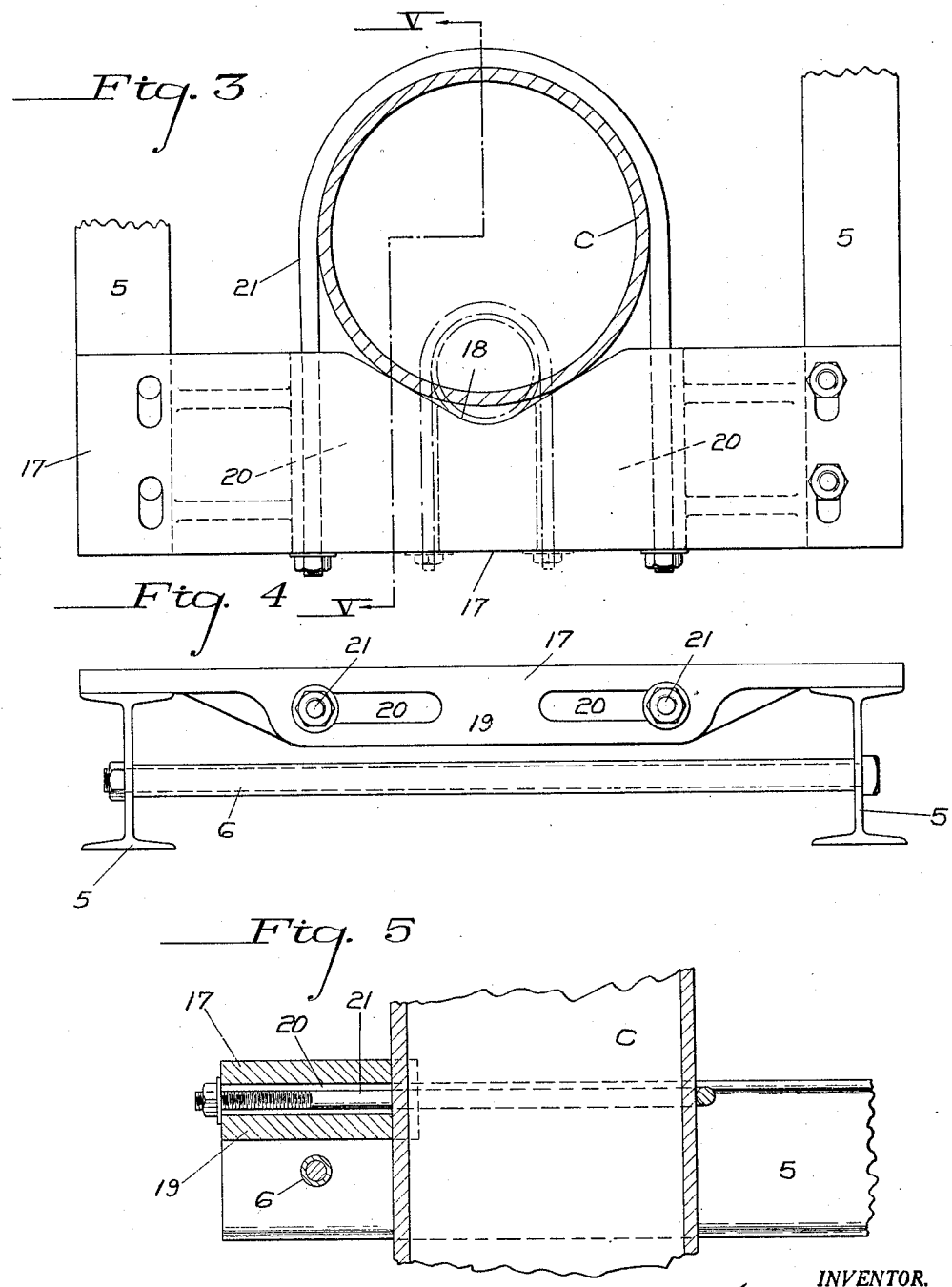

Patented June 11, 1929.

1,716,817

UNITED STATES PATENT OFFICE.

EDGAR E. GREVE, OF BELLEVUE, PENNSYLVANIA.

PUMPING-JACK FRAME.

Application filed February 24, 1925. Serial No. 11,324.

This invention is for an improvement in jack frames used in connection with the pumping of wells, particularly oil wells.

Due to the nature of devices of this kind and the requirements of the use to which they are put, it is necessary that they be strong and durable, adjustable as to the length of the pumping stroke, and attachable to casings of various sizes.

The present invention has for its important objects to provide a jack frame that is strong and durable, and wherein a wide variation in the length of the pumping stroke may be readily obtained, and to provide a jack readily attachable to casings of different sizes.

The invention, which is constructed along the lines of present forms of jack frames, but which has certain novel and advantageous features, may be best understood by reference to the accompanying drawings, in which:

Fig. 1 is a side elevation of the frame;

Fig. 2 is an end view of Fig. 1, with parts of the structure broken away;

Fig. 3 is a top plan view of the casing clamp;

Fig. 4 is an end view of the clamp;

Fig. 5 is a section on line V—V of Fig. 3.

In the drawings, 5 designates two I-beams forming the base of the jack and suitably connected by tie bolts 6. Resting on the base beams are the ends of uprights 7, these uprights being adjustably secured on the base beams by bolts 8, a plurality of holes 9 being provided in the flanges of the base beams to permit of such adjustment. The uprights may be braced by diagonal bars 10 adjustably connected to the base beams in a similar manner.

Near the top of the uprights 7 are bearing blocks 11 in which are trunnions 12 of a beam supporting member 13. This member has a clamping plate $13^a$ adjusted and retained in place by nut $13^b$ and bolt $13^c$. The beam, supported by the member 13 is preferably comprised of two channel bars 14 clamped between plate $13^a$ and the body of member 13, as clearly shown in Fig. 2. By loosening nut $13^b$, the beam may be shifted longitudinally with respect to its rocking support in the upright.

The forward end of the rocking beam carries the usual bearing 15, in which a cross pin $a$ on the polish rod A is engaged in the usual manner. Near the forward end of the beam is a longitudinally adjustable connecting joint 16. This member may be adjusted by passing the bolts $16^a$ by which it is secured to the beam, through any of the several sets of holes $16^b$ in the beam.

Suitably secured to the forward ends of the base beams is a clamping plate 17, preferably having a V-shaped notch 18 therein. This plate is cast with a depending portion or boss in which are two spaced apart slots 20. The opposite ends of a U-bolt 21 that extends under the plate pass through the respective slots. By varying the size of the U-bolt 21, various sizes of casings C may be effectively clamped, as best shown in Fig. 3. Clamping plate 17 is adjustably secured to the beams 5 by means of bolts $17^a$ passed through openings $17^b$ formed in the plate, as particularly shown by Figs. 1 and 3. This feature of adjustment cooperating with the U-bolts of varying sizes permits the clamping structure to be positioned on casings of different diameters.

Mounted on the usual bearing plate 22 is the bearing body 23 secured to the rocking frame 24 having a vertical arm $24^a$ and a horizontal arm $24^b$. On the upper end of the vertical arm $24^a$ is a means $24^c$ for connection with the usual operating link B. On the end of the horizontal arm is a universal or other suitable connector 25 that connects with the lower end of pitman 26. The upper end of pitman 26 adjustably connects through the connecting joint 16 with the rocking beam.

It will be seen that, when the two-armed frame 24 is rocked, a rocking motion is imparted to the rocking beam. By moving connection 16 to different positions, the travel of the beam, and hence the stroke of the pump, may be varied. When it is necessary to vary the stroke beyond a point obtainable with connection 16, the rocking beam is adjusted with respect to the clamping support 13 in the manner hereinbefore described. When the beam is thus adjusted, the upright supports may also be moved to thereby get the full advantage of the adjustment of the beam, and yet maintain the working end of the beam substantially in line with the polish rod.

With the adjustment for maximum and minimum stroke and the adjustable clamp for casings of different sizes, the device is well adapted to the requirements of the oilfield.

On the rear end of the rocking beam, I preferably provide an adjustable counterweight 27.

Various changes may obviously be made in the detail construction of the several parts within the contemplation of my invention and under the scope of the appended claim.

I claim:

A jack frame having a base comprised of a pair of spaced-apart beams, an adjustable clamp plate connecting the beams having a casing engaging notched portion, a flange formed integral with the plate and having elongated slots therein, and a U-bolt associated with the plate and having its ends passed through the slots in the flange and extending under the plate to provide a rigid bearing therefor, and pump rod reciprocating means in the frame.

In testimony whereof I affix my signature.

EDGAR E. GREVE.